Dec. 31, 1929. R. G. RUMSEY 1,742,011
SCREENED FOLDING CRIB
Filed Nov. 13, 1926 2 Sheets-Sheet 1
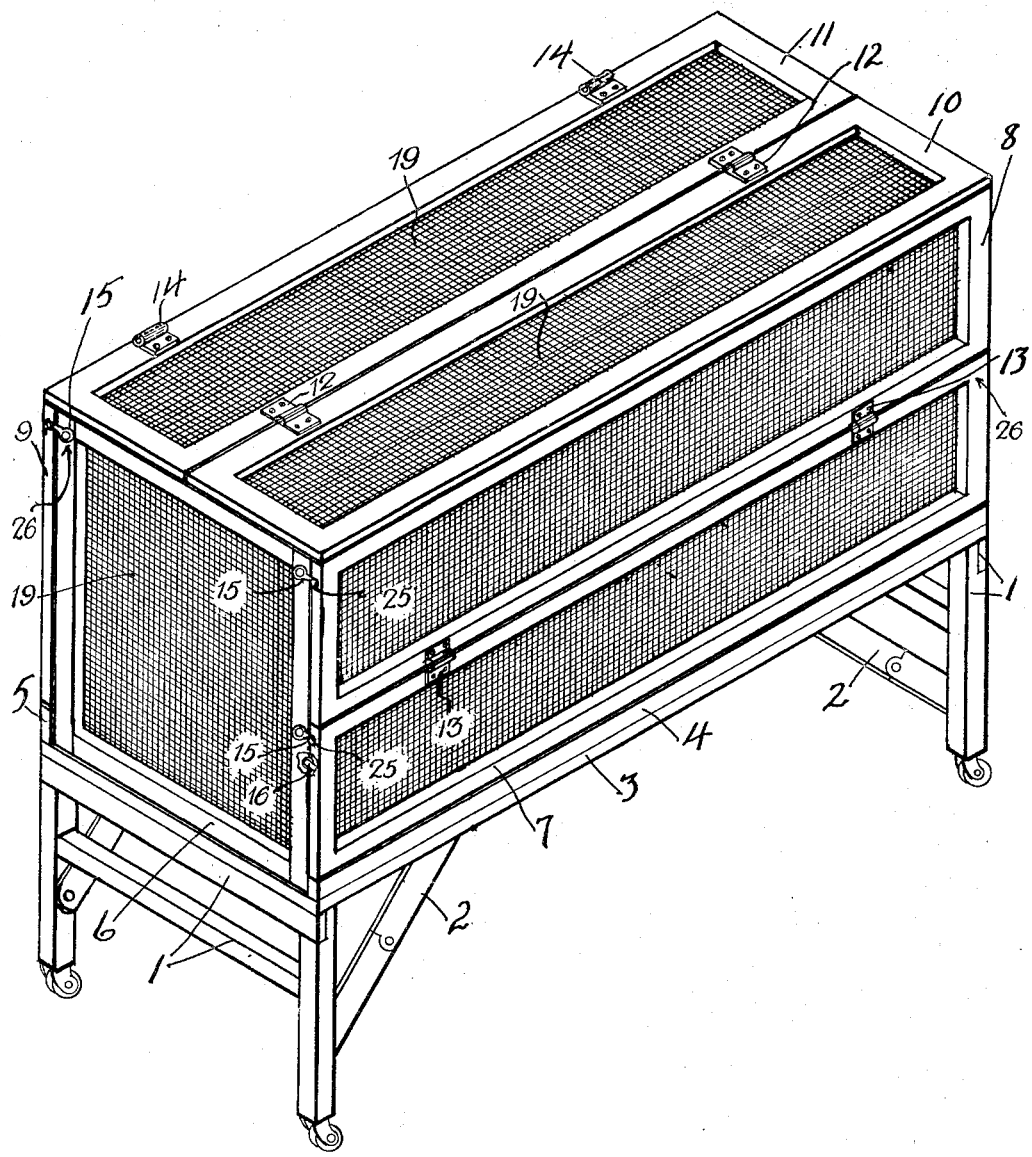
INVENTOR.
Robert G. Rumsey
BY John F. Mullaney
ATTORNEY.

Dec. 31, 1929.　　　R. G. RUMSEY　　　1,742,011
SCREENED FOLDING CRIB
Filed Nov. 13, 1926　　2 Sheets-Sheet 2
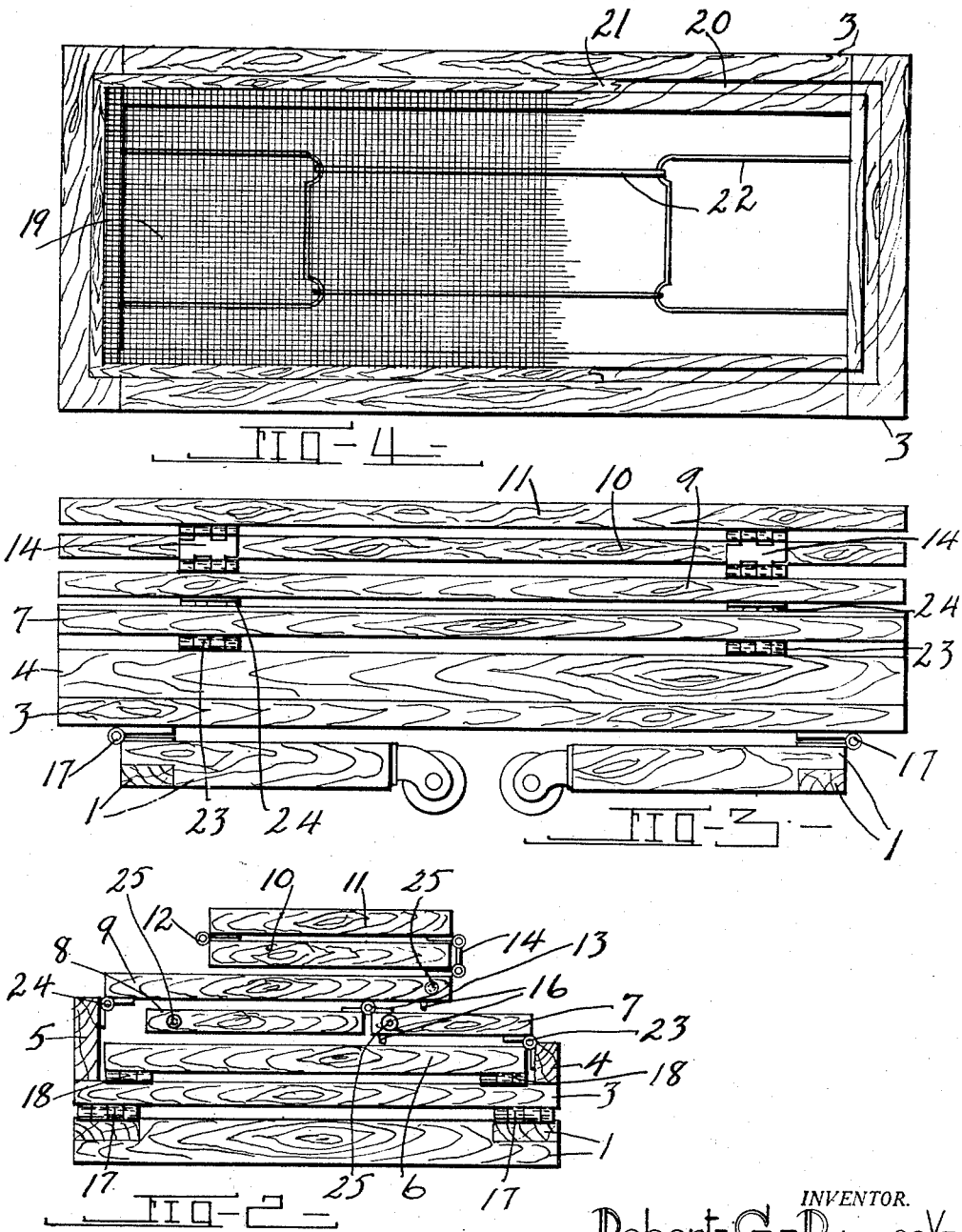

Patented Dec. 31, 1929

1,742,011

UNITED STATES PATENT OFFICE

ROBERT G. RUMSEY, OF KINSLEY, KANSAS

SCREENED FOLDING CRIB

Application filed November 13, 1926. Serial No. 148,309.

My invention relates to improvements in screened folding cribs for children, to protect them from insects or other intruding animals or influences, and so constructed of hinged or pivoted panel members that it can be compactly folded upon itself so as to be carried or stored compactly while not in use, and so as to be conveniently and quickly unfolded and formed into a screen crib.

Some of the objects of my improvements are, first, to provide a safe place for a sleeping infant to protect it from dangerous and annoying insects; second, to protect a child from marauding quadrupeds, as mice and rats; third, to protect larger persons in a similar way; fourth, to provide means for protecting food or other articles from insects or other animals; fifth, to provide a folding means for the screened crib that will enable the operator to quickly fold the screened crib upon itself into a compact form for more convenient transportation or storage; sixth, for providing a means for securing animals from escape or from intrusion by others.

I attain these objects by means of the mechanisms and appliance illustrated in the accompanying drawings, in which—Figure 1, is a perspective view of the entire screened folding crib, set up ready for use; Fig. 2, is an end view of the crib appliance as folded ready for transportation or storage; Fig. 3, is a side view of the crib appliance folded as in Fig. 2; and Fig. 4, is a plan view of the bottom panel showing how the bottom screen is supported and how the screen is secured to the panel.

Similar numerals refer to the similar several parts throughout the several views and figures.

Numeral 1, represents the foldable leg structure; 2 designates the leg supports; 3 designates the bottom panel, 1; 4 designates a bar strip of a width slightly thicker than the end panels and permanently secured to the top of panel 3, in Fig. 3, and to which the lower front panel is hinged at 23; 5 designates a bar strip twice the width of 4, and rigidly secured to panel 3, at the opposite side from 4, and to which the back panel 9 is hinged at 24; 6 indicates the end panels which are hinged at 18, to the top of the ends of the bottom panel 3, and fold down upon 3, as shown in Fig. 2; 8 designates the upper front panel which is hinged at 13, to the panel 7; 9 designates the rear panel which is hinged upon bar 5, and carries the top panels 11 and 10, as shown in Figs. 1 and 2; the double hinges or pivots 14, directly connect panels 9 and 11, and panel 10 is hinged directly to panel 11 at 12; panel 8 is hinged on panel 7 at 13, and the latter two panels are held against the end panels 6 by means of the hook members 15, engaging the projecting pins 25. The said hooks 15 and pins 25 secure the front and back panels in an upright position to the end panels 6 as shown in Fig. 1. To prevent the careening of the crib I have provided projecting dowels permanently secured in the edges of the end panels 6 as shown in Fig. 1, at 16, and they loosely enter recesses provided in the front and back panels at points designated by the arrows 26.

The leg members 1, secured by the pivot hinges 17, to the bottom panel 3, are foldably secured and can be held uprightly by means of the folding supports 2. The crib can be successfully used with said legs folded or extended as desired.

It will be noticed that the bottom panel 3, is the base upon which the end panels 6 are secured by hinges 18, and the front and back panels are secured by means of their respective hinges 23 and 24, on their respective bar strips 4 and 5, which are rigidly secured to said bottom panel 3.

All of said panels are filled in and closed by connecting wire screen fabric, which may be made of any desired and appropriate metal, and it is secured at its outer edges to the grooves 20, Fig. 4, near the inner edge of the panel frame by means of the rabbet strip 21, or otherwise, thus leaving the screen fabric at a level with the face of the panel frame.

The bottom panel has the screen supported by the truss wire frame extending from end to end beneath the screened bottom, to support the additional weight of a person and bedding or other articles therein. Said truss comprises two U-shaped members with their open ends secured into the end cross-members of the bottom panel 3, with their closed part extending toward each other and having depressed curves in the corners of the closed part. Said U-shaped members are constructed of wire rods and additional wire rods extend longitudinally of the crib and connect said members by being secured thereto at said depressed curves as shown in Fig. 4, at 22.

One of the principal advantages of this appliance is its compact condition when folded, and the facility of folding and unfolding it.

My said screened folding crib is especially appropriate to be folded so as to be carried on an automobile, or stood in a corner or shoved under a member of furniture, because of its compactness when folded. It is durable and convenient and easily manipulated.

The use of the dowels and hooks and pins, herein named and illustrated are stabilizing means of construction in this crib.

Having described and illustrated the construction and uses of my screened folding crib, I claim—

A collapsible crib comprising eight rectangular and non-equilateral frames with screened panels, and including the combination of a bottom frame, a truss support for same, comprising two U-shaped wire members with their open ends secured to the end cross-members of the bottom panel and with their closed part extending toward each other longitudinally of the crib, depressed curves formed in the closed corners of said U-shaped members adapted to receive and hold truss rods, and truss rods secured to said curves and tightly binding said U-shaped members toward each other, a bar longitudinally secured to the front top edge of said bottom frame and a somewhat higher bar secured to the rear top edge of said bottom frame, end frames hinged one to the top of each end of said bottom frame and adapted to stand upright and to fold down on said bottom frame, and between said bars, a back frame hinged to the top inner edge of said higher bar, a front side to said crib comprising two frames hinged longitudinally together at their outer conjoining edges and the lower of said two frames being hinged at its lower inner edge to the top inner edge of said bar secured to the front top edge of said bottom frame and adapted to fold down on said end frames and when upright to be latched uprightly by raising said end frames against the inner sides of said back frame and the lower one of said two frames, a lid member to said crib, comprising two frames hinged together on their upper conjoining longitudinal edges and adapted to fold together on their upper side, one of said frames being hinged at its upper outer edge to a link which is hinged to the upper outer edge of said back frame, and adapting said lid frames to fold together and then fold down on the outer side of said back frame, means for latching or hooking said frames front and back when upright to said endframes and means for opening a part of said front or a part of said lid or both, without impairing the rigidity of said crib.

ROBERT G. RUMSEY.